US006217106B1

(12) United States Patent  
Reckner, Jr.

(10) Patent No.: US 6,217,106 B1  
(45) Date of Patent: Apr. 17, 2001

(54) FOLDING TRAILER WITH EXPANDABLE BED ASSEMBLY

(75) Inventor: Charles R. Reckner, Jr., Boswell, PA (US)

(73) Assignee: Fleetwood Folding Trailers, Inc., Somerset, PA (US)

( * ) Notice: Subject to any disclaimer, the term of this patent is extended or adjusted under 35 U.S.C. 154(b) by 0 days.

(21) Appl. No.: 09/407,409

(22) Filed: Sep. 29, 1999

Related U.S. Application Data (60) Provisional application No. 60/102,522, filed on Sep. 30, 1998.

(51) Int. Cl.[7] ............... A47C 17/64; B60P 3/39; B60P 3/355
(52) U.S. Cl. ............ 296/173; 296/169; 296/170; 5/119
(58) Field of Search .................. 296/169, 170, 296/173, 174, 156, 165, 26.1; 5/118, 119, 20, 10.1

(56) References Cited

U.S. PATENT DOCUMENTS

| | | | | |
|---|---|---|---|---|
| 531,461 | * | 12/1894 | Gautran | 5/20 |
| 1,527,105 | * | 2/1925 | Zagelmeyer | 296/164 |
| 3,466,082 | * | 9/1969 | Branch | 296/164 |
| 3,475,047 | * | 10/1969 | Daniels | 296/170 |
| 3,560,042 | * | 2/1971 | McCarthy | 296/170 |
| 3,572,809 | * | 3/1971 | Buland | 296/175 |
| 3,583,755 | * | 6/1971 | Hedrick, Jr. | 296/170 |
| 3,608,953 | * | 9/1971 | Bernard | 296/169 |
| 3,659,893 | * | 5/1972 | Steele | 296/164 |
| 3,697,121 | * | 10/1972 | Park | 296/170 |
| 4,005,898 | * | 2/1977 | Way | 296/174 |
| 4,294,484 | * | 10/1981 | Robertson | 296/156 |
| 4,548,438 | * | 10/1985 | Myers | 296/164 |
| 4,826,235 | | 5/1989 | Zwick | 296/170 |
| 4,918,772 | * | 4/1990 | Haile | 296/174 |
| 5,011,216 | * | 4/1991 | Baughman | 296/164 |
| 5,050,927 | * | 9/1991 | Montanari | 296/175 |
| 5,787,522 | * | 8/1998 | Swihart | 5/118 |
| 5,971,471 | * | 10/1999 | Gardner | 296/175 |
| 5,992,920 | * | 11/1999 | Bailey et al. | 296/169 |
| 6,102,468 | * | 8/2000 | Lowrey et al. | 296/169 |

* cited by examiner

Primary Examiner—D. Glenn Dayoan  
Assistant Examiner—Hilary Gutman  
(74) Attorney, Agent, or Firm—Webb Ziesenheim Logsdon Orkin & Hanson, P. C.

(57) ABSTRACT

A folding trailer having at least one expandable bed assembly includes a trailer body having sidewalls, end walls and a guide rail attached to each of the sidewalls. The sidewalls and end walls of the trailer body define an internal space. The folding trailer further includes a first mattress frame having extension rails slidably received in the guide rails attached to the sidewalls of the trailer body. The first mattress frame is movable between a retracted position in which the first mattress frame at least partially encloses the internal space defined by the trailer body and an open position in which the first mattress frame extends outward from an end wall of the trailer body leaving an external space between a leading edge of the first mattress frame and the end wall. The leading edge of the first mattress frame includes a support member extending into the external space. The folding trailer also includes a second mattress frame connected to the end wall of the trailer body and movable between a first position in which the second mattress frame is received within the internal space defined by the trailer body and a second position in which the second mattress frame is positioned in the external space defined between the leading edge of the first mattress frame and the end wall of the trailer body. The second mattress frame is positioned beneath the first mattress frame when the first mattress frame is in the retracted position.

20 Claims, 8 Drawing Sheets

FOLDING TRAILER WITH EXPANDABLE BED ASSEMBLY

CROSS REFERENCE TO RELATED APPLICATION

This application claims the benefit of U.S. Provisional Application Serial No. 60/102,522, filed Sep. 30, 1998 and entitled "Folding Trailer With Expandable Bed Assembly".

BACKGROUND OF THE INVENTION

1. Field of the Invention

The present invention relates to folding camping trailers and, more particularly, to folding camping trailers having expandable beds.

2. Description of the Prior Art

Folding camping trailers typically have a trailer body with an extendable hard-shell top portion. The trailer body usually includes two expandable beds that extend slidably outward from end walls of the trailer body. An example of a folding camping trailer having a pair of expandable beds is disclosed in U.S. Pat. No. 4,825,235 to Zwick.

Prior to the use of expandable beds in folding camping trailers, the sleeping area of the beds in folding camping trailers was generally constrained by the area defined by the trailer body. For example, a trailer body 8 feet long by 5 feet wide has a total "living" area of 40 square feet without expandable beds. Therefore, if a prior art trailer body without expandable beds was equipped with two equally sized beds, each bed could be no larger than 4 feet long and 5 feet wide for a total usable sleeping area of 40 square feet.

To provide a usable sleeping area that is larger than the living area defined by the trailer body, the Zwick patent generally discloses a pair of expandable beds which extend outward from the end walls of the trailer body. The expandable beds disclosed by the Zwick patent each generally include a pair of parallel extension arms, a first mattress frame attached to the parallel extension arms and a second mattress frame coupled to the first mattress frame. A rear mattress portion is supported on the first mattress frame and a front mattress portion is supported on the second mattress frame. The second mattress frame is pivotally connected to the first mattress frame by parallel pivot links, with the second mattress frame resting on an upper surface of the rear mattress portion during periods of nonuse. The parallel pivot links are connected by a torsion bar.

In operation, the expandable beds disclosed by the Zwick patent are extended slidably away from the end walls of the trailer body. The first mattress frame at each end of the trailer body does not rest on the trailer body but extends beyond the trailer body a distance approximately equal to the width of the second mattress frame. When each expandable bed is pulled out to its full extent, or to its extended position, the second mattress frame for each expandable bed is pivotally moved toward the respective end walls of the trailer body. The second mattress frame at each end of the trailer body rests on the parallel extension arms connected to the respective first mattress frames. The second mattress frame at each end of the trailer body fills in the space between the respective first mattress frames and the trailer body. The second mattress frame in combination with the first mattress frame at each end of the trailer body create two flat sleeping surfaces that together have a total usable sleeping area which is larger than the living area defined by the trailer body.

One disadvantage of the arrangement disclosed by the Zwick patent is that stacking the second mattress frame on top of the first mattress frame when the trailer is in the folded position increases the overall height of the folding camping trailer and, in particular, the top portion. In order to keep the overall height of folding camping trailers standardized, folding camping trailers with stacked beds necessarily suffer a corresponding decrease in the trailer body height to compensate for the additional height of the top portion. Therefore, two different trailer bodies must be manufactured along with two different top portions in order for the overall height of folding camping trailers with expandable beds to be equal to the overall height of folding camping trailers without expandable beds.

It is, therefore, an object of the present invention to provide a folding camping trailer with expandable beds which do not increase the overall height of the folding camping trailer and which overcomes the disadvantages present in the prior art.

SUMMARY OF THE INVENTION

The above objects are accomplished with a folding trailer with an expandable bed assembly in accordance with the present invention. The folding trailer generally includes a trailer body having sidewalls and a guide rail attached to each of the sidewalls. The trailer body defines an internal space. The folding trailer further includes a first mattress frame having extension rails received slidably in the guide rails attached to the sidewalls of the trailer body. The first mattress frame is movable between a retracted position in which the first mattress frame at least partially encloses the internal space defined by the trailer body and an extended position in which the first mattress frame extends outward from an end wall of the trailer body leaving an external space between a leading edge of the first mattress frame and the end wall. The leading edge of the first mattress frame includes a support member extending into this external space. A second mattress frame is connected to the end wall of the trailer body and is movable between a first position in which the second mattress frame is received within the internal space defined by the trailer body and a second position in which the second mattress frame is positioned in the external space defined between the leading edge of the first mattress frame and the end wall of the trailer body. The second mattress frame is supported in the external space by the support member and the end wall. The second mattress frame is positioned beneath the first mattress frame when the first mattress frame is in the retracted position.

A first mattress portion may be supported on top of the first mattress frame. The second mattress frame may include a base member and have a second mattress portion connected to the base member. The second mattress portion may be detachably connected to the base member such that when the second mattress frame is moved between the first and second positions, the second mattress portion remains attached to the base member. The second mattress frame is preferably rotatably connected to the end wall of the trailer body with at least one hinge. A handle attachment may be connected to the second mattress frame for rotating the second mattress frame between the first and second positions. The second mattress frame may be supported in the first position by a support structure located within the internal space defined by the trailer body. The support member at the leading edge of the first mattress frame may extend substantially a distance between the extension rails of the first mattress frame. The first and second mattress frames may be made of aluminum and the base member of the second mattress frame may be made of wood. A method of using a folding trailer having an expandable bed assembly is also part of the present invention.

Further details and advantages of the present invention will become apparent with the following detailed description in conjunction with the drawings.

DESCRIPTION OF THE PREFERRED EMBODIMENTS

Figure 1:
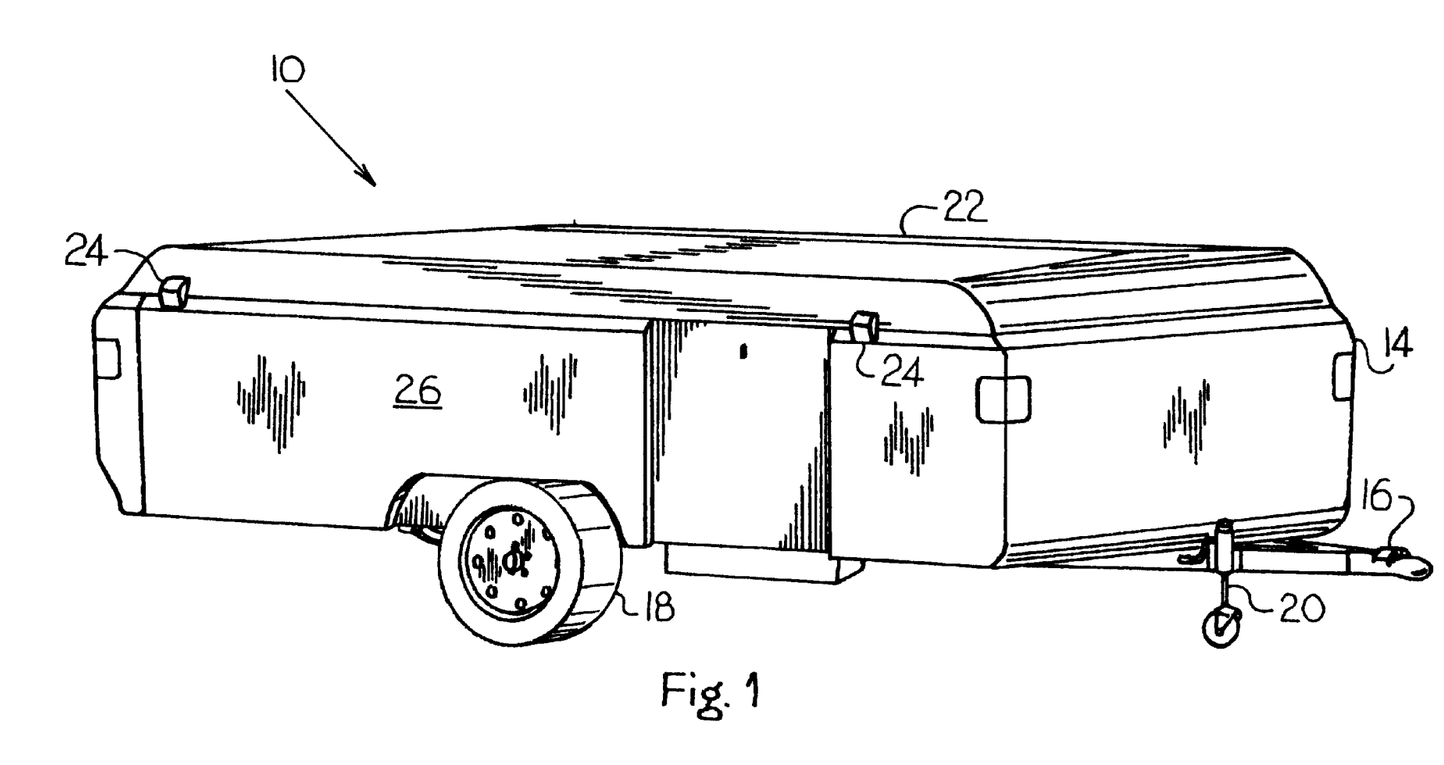
FIG. 1 is a perspective view of a folding trailer with an expandable bed assembly in accordance with the present invention and showing the folding trailer in a closed position.
Figure 2:
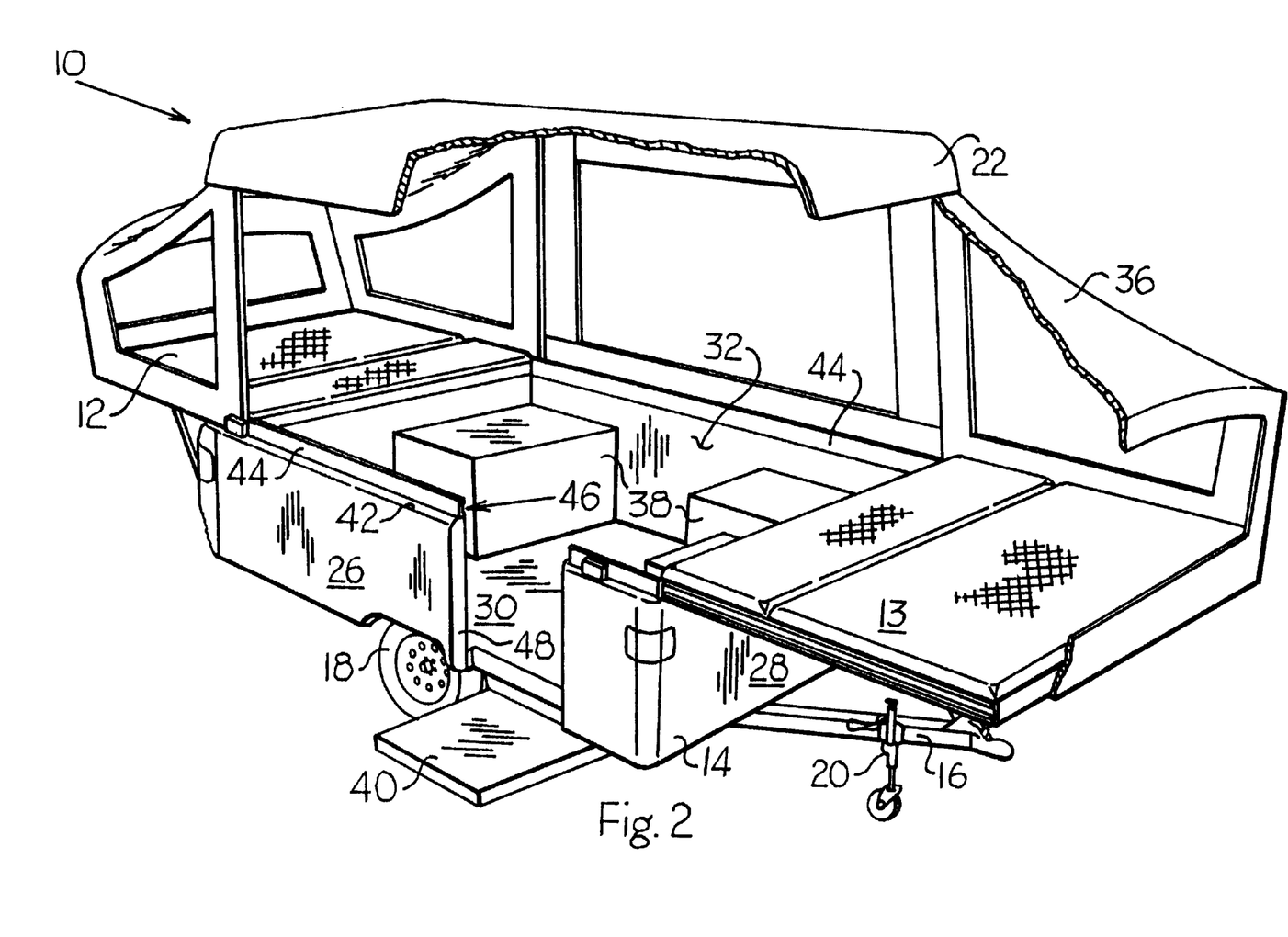
FIG. 2 is a perspective view of the folding trailer of FIG. 1 showing the folding trailer in an open position.

FIGS. 1 and 2 generally show a folding camping trailer 10 (hereinafter "folding trailer 10") having expandable beds or bed assemblies 12, 13 in accordance with the present invention. The folding trailer 10 is shown in a closed position in FIG. 1 and in an open or raised position in FIG. 2. The folding trailer 10 generally includes a trailer body 14 having a rectangular shape. The trailer body 14 is attached to a chassis 16 which has wheels 18 and a trailer hitch 20 for towing the folding trailer 10. The folding trailer 10 further includes a hard-shell top portion 22 which is expandable upward from the trailer body 14. As shown in FIG. 1, a plurality of latches 24 is used to securely fasten the top portion 22 to the trailer body 14 when the folding trailer 10 is in the closed position.

The trailer body 14 generally includes two longitudinally extending sidewalls 26 and two connecting end walls 28. The trailer body 14 further includes a floor 30 forming a base for the sidewalls 26 and the end walls 28. The floor 30, the end walls 28 and the sidewalls 26 form an open-topped structure and define an internal space 32 of the trailer body 14. A flexible tent or canopy 36 is attached between the top portion 22 and the trailer body 14. The canopy 36 generally encloses the internal space 32 defined by the trailer body 14.

The internal space 32 in combination with the expandable beds 12, 13 forms the total usable living area of the folding trailer 10. The flexible nature of the canopy 36 allows the canopy 36 to be expanded or compressed as the top portion 22 is raised or lowered to place the folding trailer 10, respectively, in the open or closed positions. A plurality of support structures 38, such as cabinets and the like, is generally positioned in the internal space 32 defined by the trailer body 14. In the open position of the folding trailer 10, as shown in FIG. 2, the expandable beds 12, 13 preferably extend outward from the end walls 28 of the trailer body 14. The trailer body 14 further includes a pivotable platform 40 that in a raised position defines a door of the trailer body 14 and in a lower position defines a step for entering the trailer body 14.

Attached to an upper edge 42 of the sidewalls 26 of the trailer body 14 are guide rails 44. The guide rails 44 are preferably formed as C-shaped channels and are permanently connected to the upper edge 42 of the respective sidewalls 26 of the trailer body 14. The C-shaped guide rails 44 each have a channel opening 46 that faces inward toward the interior of the trailer body 14 and, more particularly, faces the internal space 32 defined by the trailer body 14. The guide rails 44 preferably extend substantially the distance between the end walls 28 of the trailer body 14 except in the vicinity of a doorway opening 48 defined by one of the sidewalls 26 in which the platform 40 is positioned when it is in the raised position.

Referring to FIGS. 3–10, the expandable beds 12 and 13 in accordance with the present invention will now be discussed in greater detail. The following description of the expandable beds 12, 13 will be limited to the expandable bed 12 located adjacent the end wall 28 at the rear end of the trailer body 14. The expandable bed 13 at the front end of the trailer body 14 is identical to expandable bed 12. The expandable bed 12 is generally defined by a rectangular-shaped mattress frame 50. The mattress frame 50 includes two extension rails 52 at opposed sides of the mattress frame 50. Connected between the extension rails 52 are first and second support members 54, 56. A central support member 58 preferably extends between the first and second support members 54, 56 and parallel to the extension rails 52. The extension rails 52 are generally formed as C-shaped channels. The extension rails 52 each have a channel opening 60 which faces outward and away from the central support member 58 and, more particularly, in the opposite direction from the guide rails 44. A substantially rigid base member 62 is preferably connected to the support structure formed by the first and second support members 54, 56 and the central support member 58. The base member 62 is positioned between the extension rails 52.

The first support member 54 generally defines a leading edge 64 of the first mattress frame 50 and the second support member 56 generally defines a trailing edge 66 of the first mattress frame 50. The first support member 54 preferably further includes a support member or lip 68 extending outward from the leading edge 64 of the first mattress frame 50. The support member or lip 68 generally extends the distance between the extension rails 52 of the first mattress frame 50. The extension rails 52 are journaled for slidable movement within the guide rails 44 attached to the sidewalls 26 of the trailer body 14. In particular, the extension rails 52 preferably co-act with rolling elements (not shown) positioned within the guide rails 44 attached to the sidewalls 26 of the trailer body 14 such that the extension rails 52 are slidable relative to the guide rails 44.

Figure 3:
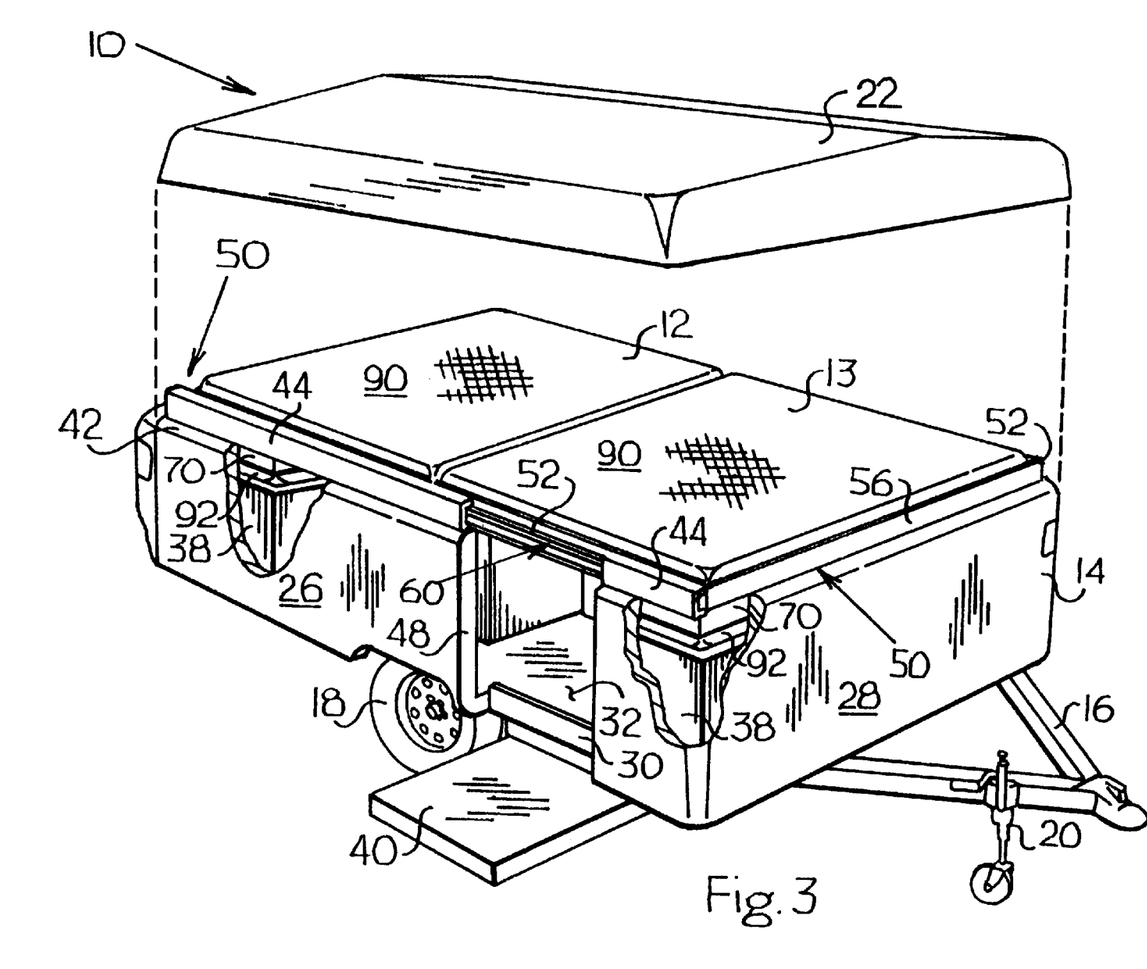
FIG. 3 is a perspective and partially cut-away view of the folding trailer of FIG. 2 showing two expandable bed assemblies in a fully retracted position.
Figure 4:
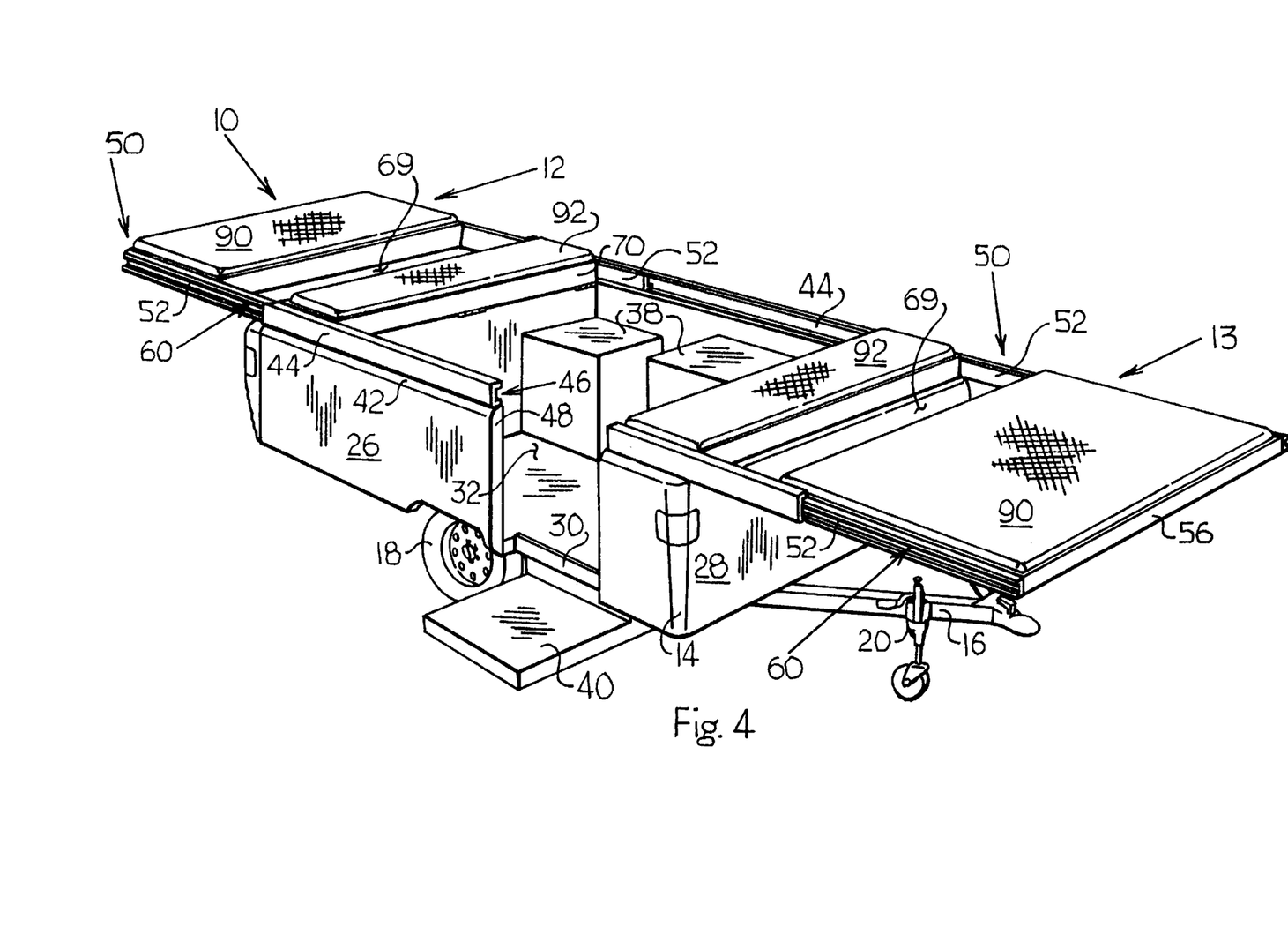
FIG. 4 is a perspective view of the folding trailer of FIG. 2 having a top portion and canopy of the folding trailer removed and showing the expandable bed assemblies in a partially extended position.

FIGS. 3 and 4 show the first mattress frame 50 in a fully retracted position and a fully extended position, respectively.

Figure 5:
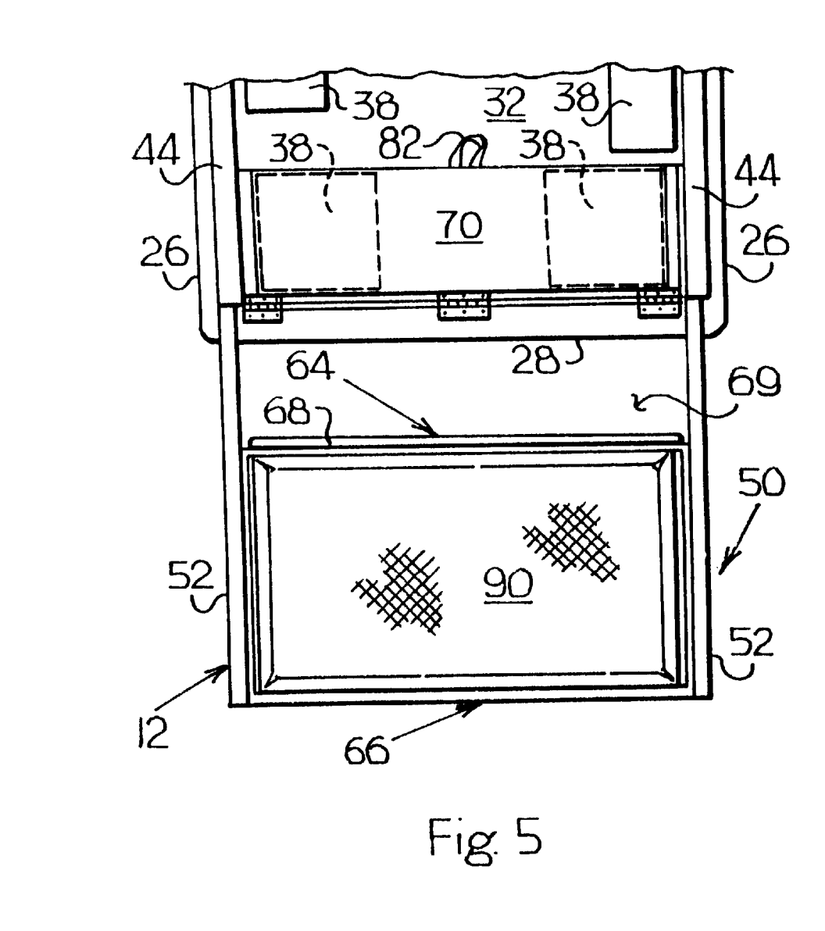
FIG. 5 is a top plan view of one of the expandable bed assemblies of FIG. 4 showing first and second mattress frames.
Figure 6:
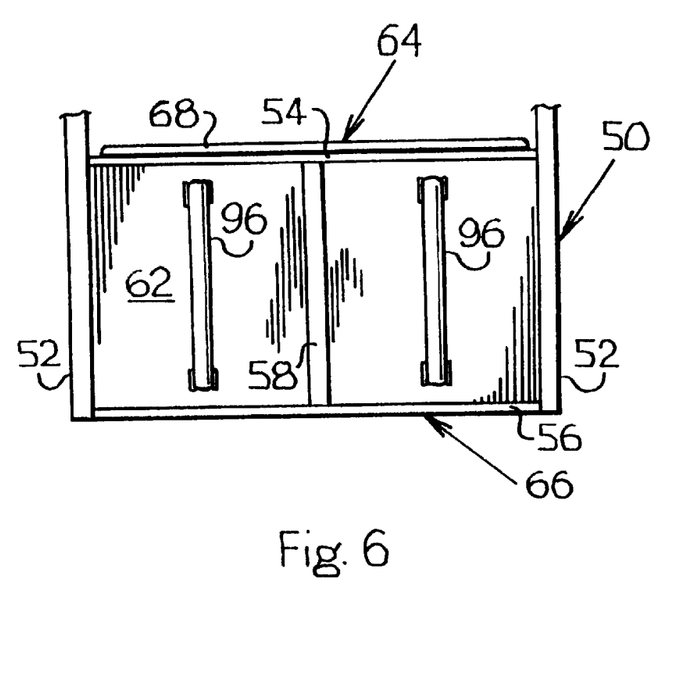
FIG. 6 is a bottom plan view of the expandable bed assembly shown in FIG. 5.

The extension rails 52 received slidably in the guide rails 44 attached to the sidewalls 26 of the trailer body 14 enable the first mattress frame 50 to be movable between the retracted position shown in FIG. 3, in which the first mattress frame 50 generally encloses approximately half of the internal space 32 defined by the trailer body 14, and the fully extended position shown in FIG. 4 in which the first mattress frame 50 extends outward from the end wall 28 of the trailer body 14 leaving an external space 69 between the leading edge 64 of the first mattress frame 50 and the end wall 28 of the trailer body 14. As shown in FIG. 5, the support member or lip 68 generally extends into the external space 69 defined between the leading edge 64 of the first mattress frame 50 and the end wall 28 of the trailer body 14. The canopy 36 of the folding trailer 10 is omitted in FIGS. 3 and 4 for clarity. The top portion 22 is omitted in FIG. 4 for clarity.

In FIGS. 3–5, a second mattress frame 70 is generally shown and is positioned within the internal space 32 defined by the trailer body 14 and adjacent the end wall 28 of the trailer body 14. The second mattress frame 70 will now be discussed in further detail with reference to FIGS. 3–5 and 7–10. The second mattress frame 70 generally includes a first rectangular support bracket 72, a second rectangular support bracket 74, a third rectangular support bracket 76 and a base member 78. The respective support brackets 72, 74, 76 generally form a three-sided rectangular shape with the base member 78 connected to each of the respective brackets 72, 74, 76.

Figures 7, 8:
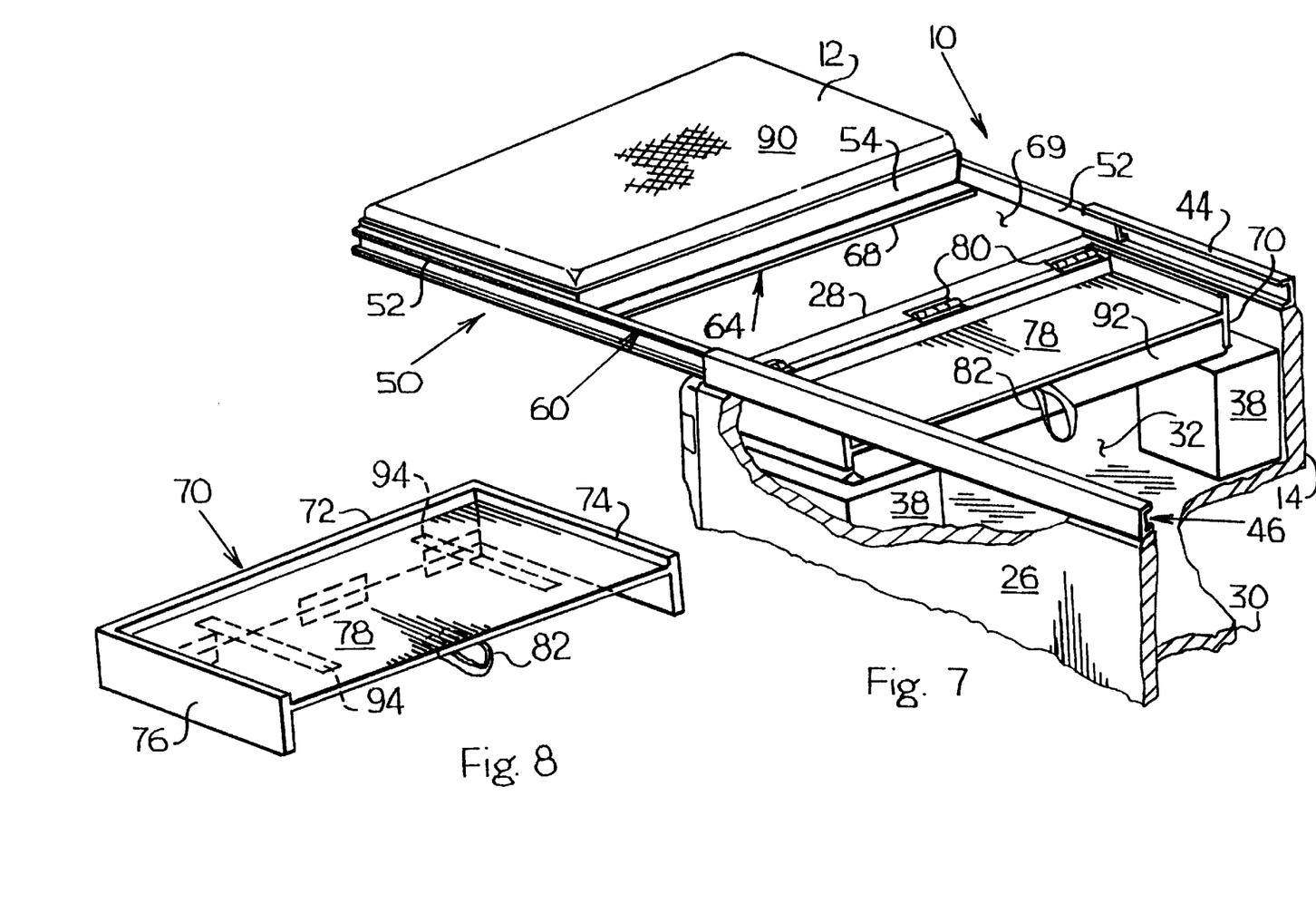
FIG. 7 is a perspective and partially cut-away view of a portion of the folding trailer shown in FIG. 2.
FIG. 8 is a perspective view of the second mattress frame used in the expandable bed assembly of FIG. 7 and showing the second mattress frame detached from the expandable bed assembly.
Figure 9:
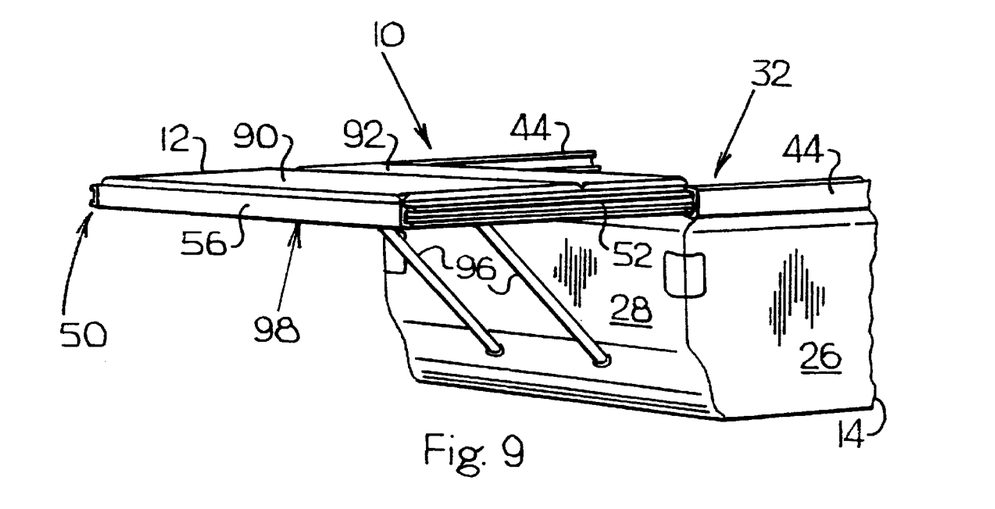
FIG. 9 is a perspective end view of the folding trailer of FIG. 2, with the expandable bed assembly shown in a fully extended and ready-for-use position.
Figure 10:
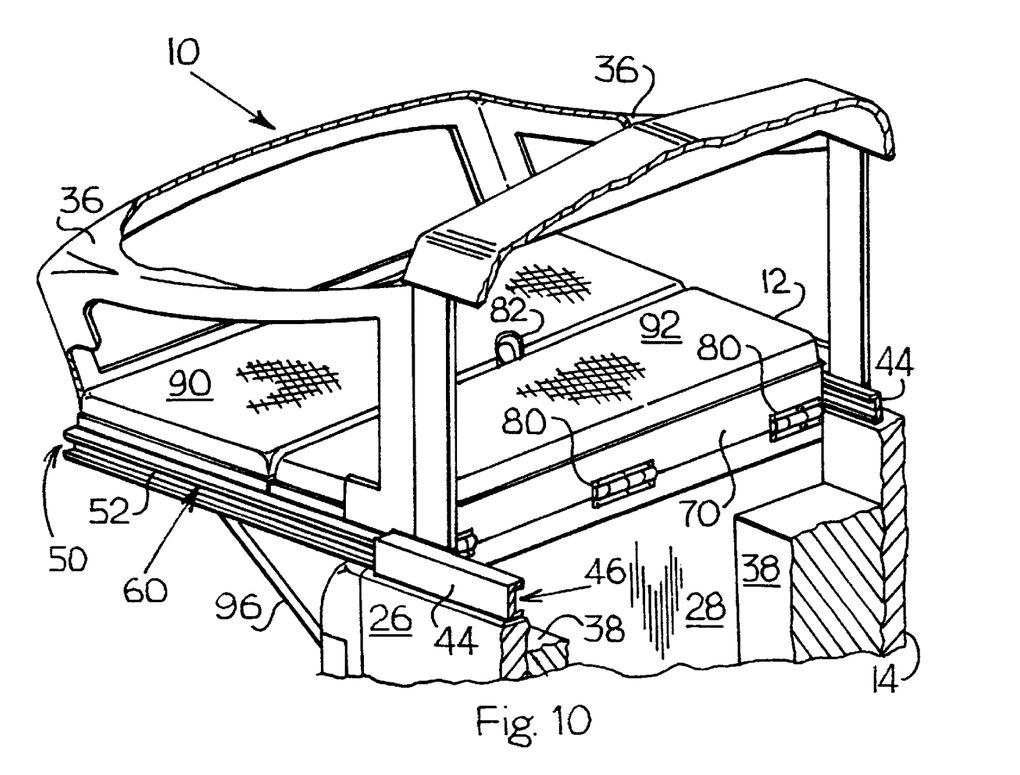
FIG. 10 is a perspective view of the folding trailer of FIG. 2 having a canopy enclosing the expandable bed assembly.
Figures 11, 12:
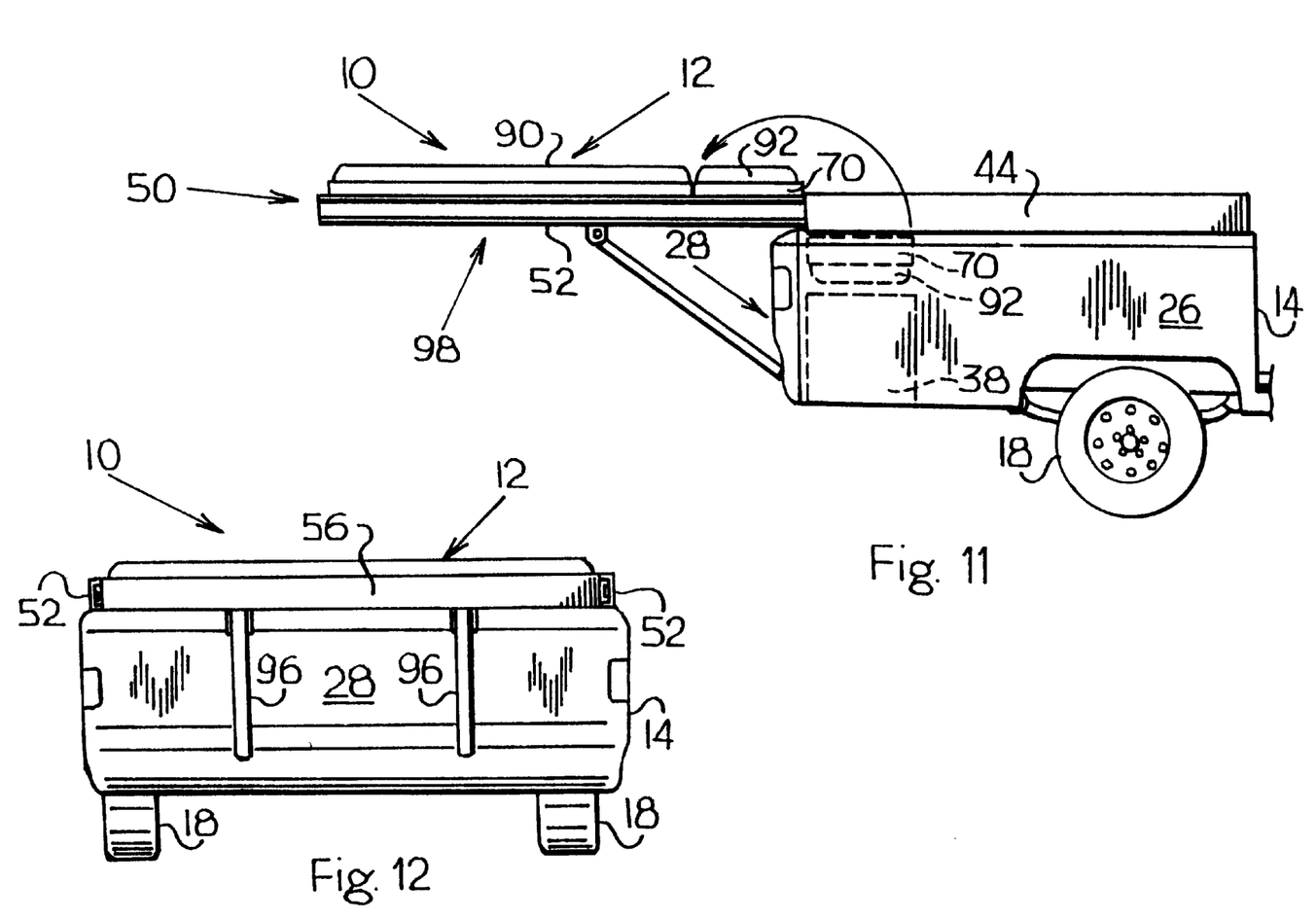
FIG. 11 is a side view of the folding trailer of FIG. 9 showing support legs in an in-use position.
FIG. 12 is an end view of the folding trailer shown in FIG. 11.

The second mattress frame 70 is attached to the end wall 28 of the trailer body 14 to be movable between a first position in which the second mattress frame 70 is received within the internal space 32 defined by the trailer body 14 as shown in FIGS. 3, 4 and 7, and a second position in which the second mattress frame 70 is positioned in the external space 69 (shown in FIG. 7) defined between the leading edge 64 of the first mattress frame 50 and the end wall 28 of the trailer body 14 as shown in FIGS. 9 and 10. In particular, the second mattress frame 70 is connected by a plurality of hinges 80 to the end wall 28 which enables the second mattress frame 70 to rotate between the first and second positions. A handle attachment 82, such as a pull tab, is preferably attached to the base member 78 of the second mattress frame 70 for rotating the second mattress frame 70 between the first and second positions.

Referring again to FIGS. 3–10, the first mattress frame 50 supports a first mattress portion 90 positioned on top of the first mattress frame 50. The first mattress portion 90 is preferably supported by the base member 62 positioned on and connected to the first and second support members 54, 56 and the central support member 58. A second mattress portion 92 is connected to one side of the base member 78 of the second mattress frame 70. The second mattress portion 92 is preferably detachably connected to the base member 78 of the second mattress frame 70 by Velcro®, or hook and loops fastener, strips 94 located on the base member 78 and on the second mattress portion 92. The second mattress frame 70 with the second mattress portion 92 connected thereto is generally supported in the first position within the trailer body 14 by the support structures 38 located within the internal space 32 defined by the trailer body 14. With the first mattress frame 50 and the second mattress frame 70 positioned, respectively, in the extended and the second positions, as shown in FIGS. 9 and 10, the expandable bed 12 is fully formed and ready for use. The usable sleeping area of each of the expandable beds 12 has been increased by the area defined by the second mattress frame 70 and the second mattress portion 92. The canopy 36 connected between the top portion 22 of the folding trailer 10 and the trailer body 14 is preferably sized to enclose the increased space defined by the expandable beds 12 at each end of the trailer body 14.

Referring to FIGS. 6 and 9–12, support legs 96 may be attached to an underside 98 of the base member (not shown) of the first mattress frame 50 and configured to cooperate with the end wall 28 of the trailer body 14. The support legs 96 act to further support the first and second mattress frames 50, 70 when positioned, respectively, in the extended and second positions. The support legs 96 are preferably rotatable between an in-use position in which the support legs 96 cooperate with the respective end walls 28 of the trailer body 14 and a nonuse position in which the support legs 96 are received and retained against the underside 98 of the base member 62 of the first mattress frame 50 by clips (not shown) or any means customary in the art.

Referring to FIGS. 2–12, operation of the folding trailer 10 having expandable beds 12, 13 in accordance with the present invention will now be discussed. As shown in FIG. 3, when the folding trailer 10 is placed in the open position with the top portion 22 raised (shown schematically in FIG. 3), the expandable beds 12, 13 substantially enclose the internal space 32 defined by the trailer body 14. The first mattress frame 50 of each of the expandable beds 12, 13 is then extended outward from the retracted position shown in FIG. 3 to the fully extended position shown in FIG. 4. The external space 69 defined between the leading edge 64 of each of the first mattress frames 50 and the respective end walls 28 of the trailer body 14 is ready to receive the second mattress frames 70 and the second mattress portions 92 connected thereto. The second mattress frames 70 are moved from the first position received within the internal space 32 defined by the trailer body 14 to the second position in the respective external spaces 69 by exerting an upward force on the handle attachment 82 connected to each of the second mattress frames 70. The second mattress frames 70 pivot about their respective hinges 80 until the second mattress frames 70 reach the second position adjacent the first mattress frames 50. As shown in FIG. 10, the first and second mattress frames 50, 70 and the first and second mattress portions 90, 92 are positioned in side-by-side relationship and generally form the expandable beds 12, 13. The second mattress frames 70 are supported in the respective external spaces 69 by the respective end walls 28 of the trailer body 14 and the support member 68 attached to each of the first mattress frames 50. The support legs 96 may be extended from the base member 62 of each of the first mattress frames 50 and placed in engagement with the end walls 28 of the trailer body 14 to further support the first and second mattress frames 50, 70. A reverse procedure is generally followed to return the folding trailer 10 to the closed position shown in FIG. 1.

The folding trailer 10 with expandable beds 12, 13 made in accordance with the present invention provides expandable beds 12, 13 which do not increase the overall height of the folding trailer 10 and overcomes the disadvantages present in the prior art. In particular, the expandable beds 12, 13 advantageously locate the second mattress frames 70 within the internal space 32 defined by the trailer body 14, which maintains the overall height of the folding trailer 10 within typical industry standards. A standard top portion 22 may thus be used with the folding trailer 10 of the present invention. In addition, the expandable beds 12, 13 of the present invention simplify the complicated "stacked" mattress arrangement utilizing parallel pivot links connected by a torsion bar as disclosed by the Zwick patent by using simple hinges 80 to connect the second mattress frames 70 to the trailer body 14 of the folding trailer 10. The expandable beds 12, 13 of the present invention effectively increase the usable sleeping area of the folding trailer 10 by the area defined by the respective second mattress portions 92.

Although the present invention was described with reference to a preferred embodiment, obvious modifications and alterations of the invention may be made without departing from the spirit and scope of the invention. The scope of the present invention is defined by the appended claims and equivalents thereto.

What is claimed is:

1. A folding trailer with at least one expandable bed assembly, comprising:
   a trailer body having sidewalls, end walls and a guide rail attached to each of the sidewalls, with the sidewalls and end walls of the trailer body defining an internal space;
   a first mattress frame having extension rails, with the extension rails received slidably in the guide rails attached to the sidewalls of the trailer body such that the first mattress frame is movable between a retracted position in which the first mattress frame at least partially encloses the internal space defined by the trailer body and an extended position in which the first mattress frame extends outward from an end wall of the trailer body leaving an external space between a leading edge of the first mattress frame and the end wall, wherein the leading edge of the first mattress frame includes a support member extending into the external space; and
   a second mattress frame rotatably connected to the end wall of the trailer body and movable between a first position in which the second mattress frame is received within the internal space defined by the trailer body and a second position in which the second mattress frame is positioned in the external space defined between the leading edge of the first mattress frame and the end wall of the trailer body, wherein the second mattress frame is supported in the external space by the support member and the end wall, and wherein the second mattress frame is positioned beneath the first mattress frame when the first mattress frame is in the retracted position.

2. The folding trailer of claim 1, wherein the second mattress frame is rotatably connected to the end wall of the trailer body with at least one hinge.

3. The folding trailer of claim 2, further including a handle attachment connected to the second mattress frame for rotating the second mattress frame between the first and second positions.

4. The folding trailer of claim 1, wherein the second mattress frame is supported in the first position by a support structure located within the internal space defined by the trailer body.

5. The folding trailer of claim 1, further including at least one support leg attached to the first mattress frame and configured to cooperate with the end wall of the trailer body to further support the first and second mattress frames when positioned, respectively, in the extended and the second positions.

6. The folding trailer of claim 5, wherein the at least one support leg is movable between an in-use position in which the at least one support leg cooperates with the end wall of the trailer body and a nonuse position in which the at least one support leg is received and retained under the first mattress frame.

7. The folding trailer of claim 1, wherein the support member at the leading edge of the first mattress frame extends substantially a distance between the extension rails of the first mattress frame.

8. The folding trailer of claim 1, wherein the first and second mattress frames are made of aluminum.

9. A folding trailer with at least one expandable bed assembly, comprising:
   a trailer body having sidewalls, end walls and a guide rail attached to each of the sidewalls, with the sidewalls and end walls of the trailer body defining an internal space;
   a first mattress frame having extension rails and supporting a first mattress portion, with the extension rails received slidably in the guide rails attached to the sidewalls of the trailer body such that the first mattress frame is movable between a retracted position in which the first mattress frame and the first mattress portion at least partially enclose the internal space defined by the trailer body and an extended position in which the first mattress frame and the first mattress portion extend outward from an end wall of the trailer body leaving an external space between a leading edge of the first mattress frame and the end wall, wherein the leading edge of the first mattress frame includes a support member extending into the external space; and
   a second mattress frame having a second mattress portion connected thereto, with the second mattress frame rotatably connected to the end wall of the trailer body and rotatable between a first position in which the second mattress frame and the second mattress portion are received within the internal space defined by the trailer body and a second position in which the second mattress frame and the second mattress portion are positioned in the external space defined between the leading edge of the first mattress frame and the end wall of the trailer body, wherein the second mattress frame is supported in the external space by the support member and the end wall, and wherein the second mattress frame and the second mattress portion are positioned beneath the first mattress frame when the first mattress frame is in the retracted position.

10. The folding trailer of claim 9, wherein the second mattress frame includes a base member, and wherein the second mattress portion is detachably connected to the base member such that when the second mattress frame is moved between the first and second positions, the second mattress portion remains attached to the base member.

11. The folding trailer of claim 9, wherein the second mattress frame is rotatably connected to the end wall of the trailer body with at least one hinge.

12. The folding trailer of claim 11, further including a handle attachment connected to the second mattress frame for rotating the second mattress frame between the first and second positions.

13. The folding trailer of claim 9, wherein the second mattress frame and the second mattress portion are supported in the first position by a support structure located within the internal space defined by the trailer body.

14. The folding trailer of claim 9, further including at least one support leg attached to the first mattress frame and configured to cooperate with the end wall of the trailer body to further support the first and second mattress frames when positioned, respectively, in the extended and second positions.

15. The folding trailer of claim 14, wherein the at least one support leg is movable between an in-use position in which the at least one support leg cooperates with the end wall of the trailer body and a nonuse position in which the at least one support leg is received and retained under the first mattress frame.

16. The folding trailer of claim 9, wherein the support member at the leading edge of the first mattress frame extends substantially a distance between the extension rails of the first mattress frame.

17. The folding trailer of claim 9, wherein the first and second mattress frames are made of aluminum.

18. A method of using a folding trailer having at least one expandable bed assembly, with the folding trailer comprising:

a trailer body having sidewalls, end walls and a guide rail attached to each of the sidewalls, with the sidewalls and ends walls of the trailer body defining an internal space;

a first mattress frame having extension rails and supporting a first mattress portion, with the extension rails received slidably in the guide rails attached to the sidewalls of the trailer body; and a second mattress frame having a second mattress portion connected thereto, with the second mattress frame rotatably connected to an end wall of the trailer body, the method comprising the steps of:

extending the first mattress frame from a retracted position in which the first mattress frame and the first mattress portion at least partially enclose the internal space defined by the trailer body and in which the second mattress frame is positioned beneath the first mattress frame, to an extended position in which the first mattress frame and the first mattress portion extend outward from the end wall of the trailer body leaving an external space between a leading edge of the first mattress frame and the end wall;

rotating the second mattress frame from a first position in which the second mattress frame and the second mattress portion are received within the internal space defined by the trailer body to a second position in which the second mattress frame and the second mattress portion are positioned in the external space defined between the leading edge of the first mattress frame and the end wall of the trailer body; and supporting the second mattress flame and the second mattress portion in the external space defined between the leading edge of the first mattress frame and the end wall of the trailer body with a support member attached to the leading edge of the first mattress frame.

19. The method of claim 18, further including the step of supporting the second mattress frame and the second mattress portion in the internal space with support structures located within the internal space.

20. The method of claim 18, further including the step of raising a top portion of the folding trailer before the step of extending the first mattress frame.

* * * * *

UNITED STATES PATENT AND TRADEMARK OFFICE
CERTIFICATE OF CORRECTION

PATENT NO. : 6,217,106 B1
DATED : April 17, 2001
INVENTOR(S) : Charles R. Reckner, Jr.

It is certified that error appears in the above-identified patent and that said Letters Patent is hereby corrected as shown below:

Column 5,
Line 54, "Velcro®" should read -- VELCRO® --.

Column 10, claim 18,
Line 13, "mattress flame" should read -- mattress frame --.

Signed and Sealed this

Thirteenth Day of November, 2001

Attest:

*Nicholas P. Godici*

NICHOLAS P. GODICI
*Attesting Officer*   *Acting Director of the United States Patent and Trademark Office*